Jan. 8, 1963
C. T. COSTELLO
3,072,799
REACTION MOTOR DRIVEN GENERATOR
Filed Jan. 18, 1960
2 Sheets-Sheet 1
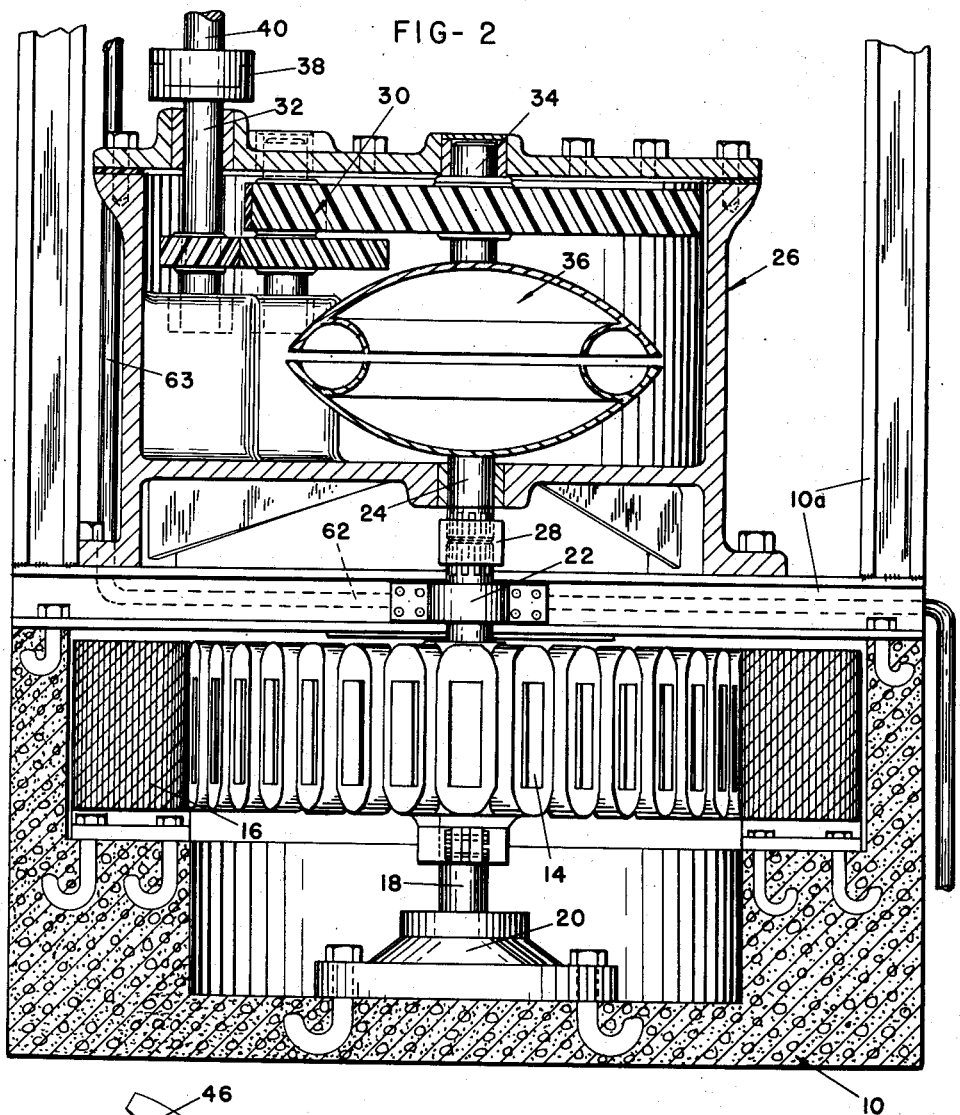
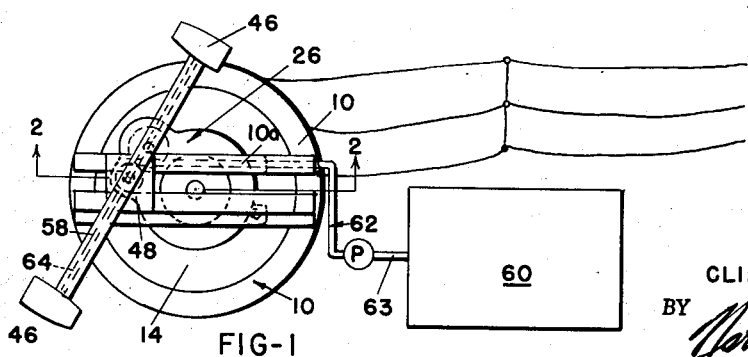
INVENTOR.
CLIFFORD T. COSTELLO Jan. 8, 1963
C. T. COSTELLO
3,072,799
REACTION MOTOR DRIVEN GENERATOR
Filed Jan. 18, 1960
2 Sheets-Sheet 2
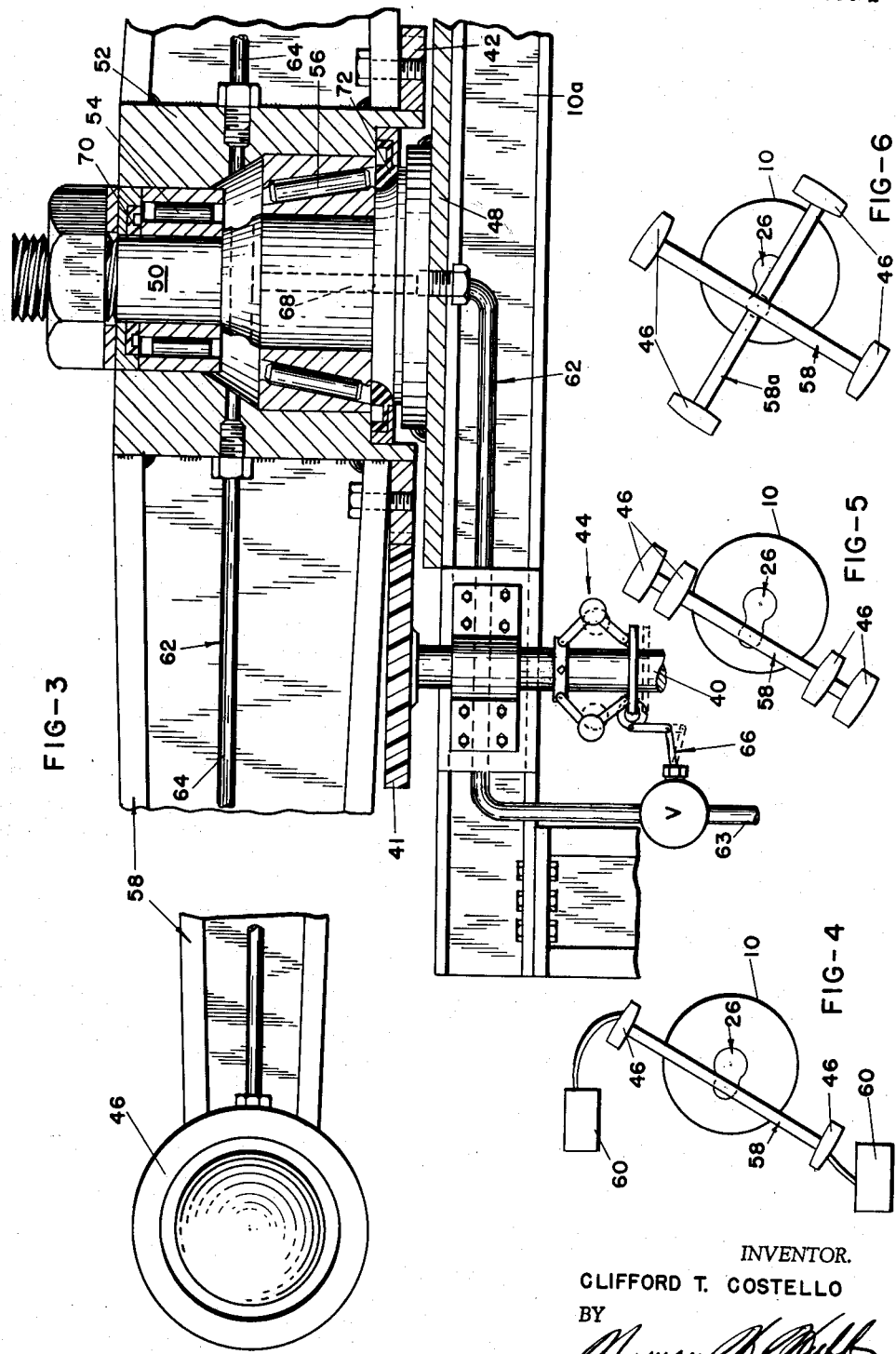
INVENTOR.
CLIFFORD T. COSTELLO
BY _United States Patent Office_

3,072,799
Patented Jan. 8, 1963

3,072,799
REACTION MOTOR DRIVEN GENERATOR
Clifford T. Costello, E. 624 Indiana, Spokane 21, Wash.
Filed Jan. 18, 1960, Ser. No. 2,970
2 Claims. (Cl. 290—52)

This invention is an electricity generator driven by one or more reaction or jet motors.

It is well known that generators to produce a constant output, for example a constant voltage in a direct current generator and in addition a constant cycle rate in an alternating current generator, must be driven at a constant speed. If the speed of a direct current generator varies, the output of the generator must be subsequently controlled by costly voltage regulating equipment. The same is true with respect to alternating current generators, but in addition, since certain electrical equipment, including clocks, are frequently dependent upon the cycle rate to maintain accurate operation, the cycle must be reasonably constant.

Commonly at fixed generating plants falling water creates pressure to drive the generators while the speed is controlled by mechanism for varying the amount of water and its effectiveness for turning the generator. In portable generating plants it is customary to employ gasoline (when small) or diesel motors to drive the generators. The speed is usually controlled by governor means adapted to actuate the throttle linkage to the carburetor or diesel pump as the case may be.

The fuel costs and over-all efficiency of the diesel driven generators make them more attractive for portable use than do the gasoline driven units, but in many cases the weight of the equipment is a deterrent to its convenient use. The comparative inefficiency and high cost of fuel renders its use less than desirable even though it is lighter. The bulk of the machinery required renders the use of steam operated plants impractical for portable use.

The present invention combines with a generator, the benefits of light weight and low fuel costs of the efficient jet or reaction motor, thus effecting production of electricity at a lower cost and admitting of more favorable units for mobility.

It is an object of the present invention to provide a reaction motor propelled electrical power producing generator.

Another object of the invention lies in the provision of a reaction propelled rotary motor carried by a journaled beam and novel means for feeding fuel to the motor through the spindle constituting a part of the journal.

Yet another object of the invention lies in the provision of a reaction motor propelled electrical power producing generator the speed of which is controlled by varying the fuel to the motor, and thus the thrust, in accordance with a speed sensing device driven commensurately with the generator.

The above and other objects of the present invention will be apparent from the following description when considered in conjunction with the accompanying drawings, wherein:

FIGURE 1 is a plan view of my reaction motor propelled electrical generator:

FIGURE 2 is an enlarged cross section taken on vertical planes indicated by lines 2—2 of FIGURE 1, and having the rotating beam removed for convenience of illustration;

FIGURE 3 is a fragmentary and further enlarged cross section taken through the beam and spindle on a vertical plane; and FIGURES 4, 5 and 6 are views on a smaller scale showing contemplated modifications of the invention employing the same principle of operation.

Referring now more particularly to the drawings, I have shown a fixed installation embodying the present invention, but it will be understood that it may be made portable without modifying the invention merely by mobilizing the supporting base.

The base is identified by the reference numeral 10 and supports a generator 12 of electrical energy which includes a conventional rotor 14 and stator 16. The rotor includes a rotor shaft 18 which is axially supported at its lower end upon a thrust bearing 20 and is radially supported near its upper end by a radial bearing 22. The shaft 18 is fixed to the output shaft 24 of a transmission means 26 by a coupling 28.

The transmission means 26 includes a train of reduction gears 30 which reduce the revolutions per minute of the input shaft 32 at a predetermined ratio so that the impeller shaft 34 of the fluid coupling unit 36 is driven at the specific r.p.m. required to rotate the output shaft 24 and therefore the rotor shaft 18 at the optimum predetermined speed.

The input shaft 32 is coupled by means of a clutch 38 to the driving shaft 40 supported by means of a pillow block or other suitable bearing for rotation on a fixed frame 10a forming a super structure or part of the base 10. At its upper end the driving shaft 40 carries a gear 41 fixed thereto which is in mesh with a ring gear 42 from which rotary motion is received. At a selected point along its length the driving shaft 40 is provided with a governor 44 or other speed sensing device. Preferably I employ a governor of the fly ball type, which may be actuated from any selected rotating element which is substantially constant with the drive for the generator. In practice this is on the side of the fluid coupling unit from which power is received to prevent cyclic fluctuations in the driving reaction motors 46 while permitting sensitive adjustment of the governor. Conceivably a less sensitive speed sensing device could be driven from the generator shaft 18 or other rotating member on the generator side of the fluid coupling unit 36 however.

The clutch 38 is preferably of the manually controlled type so that it may be disengaged when starting the generator unit if desired. This normally is desirable because the jet or reaction motors 46 are less efficient at relatively slow speed where the ram effect is not available.

A base plate 48 is welded or otherwise secured to and becomes an integral part of the supporting frame 10a. Rigidly fixed to the base plate 48 is an axially vertical spindle 50. Concentrically arranged with respect to the spindle 50 is a hollow hub 52 which is maintained in this concentric relationship therewith for rotation thereon by an upper radial bearing 54 and a lower radial-thrust bearing 56. Diametrically opposed arms constituting an elongated beam 58 radiate from the hub, which beam is supported thereby for rotary motion in a plane normal to the axis of the spindle 50. Spaced from the center, preferable at its ends, the beam 58 has one or more jet or reaction motors 46 so arranged as to effect rotation of the beam 58 about the spindle 50 by action of the motors 46 in a well known manner. The ring gear 42 is bolted or otherwise secured to the beam 58 in concentricity to the spindle 50 and meshes with the drive gear 41 and thus imparts movement from the beam to the transmission 26.

A source of fuel is indicated by the reference numeral 60. At certain times it is required that the fuel be pressurized as by gravity or a pump P so that fuel may be supplied to the reaction motors 46 when starting them.

Once the beam is rotating at a reasonable r.p.m., however, fuel is supplied by centrifugal force and no further need of pressurization is apparent.

A fluid fuel supply conduit 62 includes a feed pipe 63, a fluid fuel supply pipe 64, and a running connection 65 therebetween which is disposed at the spindle-hub connection. A flow control valve V is operatively connected in the feed pipe 63 to vary the quantity of fuel allowed to flow through the fuel supply conduit 62 and is operatively connected to be controlled by the governor 44 by means of articulate linkage 66.

In FIGURE 3 the running connection 65 is shown to be provided by forming a passage 68 in the spindle 50. The feed pipe 63 is connected to supply fuel in the passage which opens interiorly of the hollow hub 52. Fluid seals 70 and 72 are provided at the upper and lower ends of the hub 52 and are adapted to prevent fluid fuel from escaping between the hub 52 and spindle 50. The fuel supply pipes 64 communicate through the wall of the hub 52 and thus admit fuel from the area interior of the hub to the motors 46 with which they connect.

FIGURES 4, 5, and 6 respectively disclose species in which the fuel is carried by the beam 58 and moves therewith, a beam 58 supports two motors 46 on each end portion, and crossed beams 58 and 58 provide plural motors at the same radius.

It should be understood that this source of rotary motion is designed so that the spindle is at the centrifugal null of the beam 58 so that the centrifugal forces diametrically opposed with respect to the hub counteract each other and eliminate unnecessary stresses on the spindle 50.

Having thus described my invention, I claim:

1. A reaction propelled rotary motor comprising a fixed spindle carried by a supporting frame; a hollow hub in said beam journaled for rotation on said spindle with said beam disposed radially thereof; a reaction propulsion device on said beam for rotating the beam about said spindle; a fluid fuel supply pipe communicating said reaction propulsion device interiorly of said hub; spaced fluid seals sealing between said hub and said spindle whereby to form a sealed compartment therebetween; and said spindle having a fluid passage opening into said compartment and communicating with a source of fluid fuel.

2. A reaction propelled constant speed electrical power plant comprising a beam journaled for rotation on an axis normal to the length of the beam and at its centrifugal null; a reaction propulsion device fixed on said beam for rotating said beam about said axis; a fluid fuel supply conduit communicating a remote source of fluid fuel with said reaction propulsion device and including a running connection at said journal; a generator; transmission means operable to impart rotary motion from said beam to drive said generator; a flow control valve in said fluid fuel supply conduit for varying the quantity of fuel admitted to said reaction propulsion device from said source; a governor driven by said rotating beam and operatively connected to said flow control valve for actuating the valve to alternately constrict and open the conduit when the governor exceeds and lags respectively a predetermined revolutions per minute.

References Cited in the file of this patent
UNITED STATES PATENTS

| | | |
|---|---|---|
| 2,694,457 | Murdock | Nov. 16, 1954 |
| 2,865,168 | Zillman et al. | Dec. 23, 1958 |
| 2,895,259 | Beckett | July 21, 1959 |